United States Patent
Payyoor et al.

(10) Patent No.: US 10,738,653 B2
(45) Date of Patent: Aug. 11, 2020

(54) SQUEEZE FILM DAMPER ASSEMBLIES

(71) Applicant: General Electric Company, Schenectady, NY (US)

(72) Inventors: Narayanan Payyoor, Karnataka (IN); Satish K. Yadav, Karnataka (IN); Shuvajyoti Ghosh, Karnataka (IN); Ravindra Shankar Ganiger, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/970,203

(22) Filed: May 3, 2018

(65) Prior Publication Data

US 2018/0320553 A1    Nov. 8, 2018

(30) Foreign Application Priority Data

May 3, 2017    (IN) .............................. 201741015668

(51) Int. Cl.
*F01D 25/16* (2006.01)
*F16C 27/04* (2006.01)
(Continued)

(52) U.S. Cl.
CPC .............. *F01D 25/164* (2013.01); *F02C 7/06* (2013.01); *F16C 27/045* (2013.01);
(Continued)

(58) Field of Classification Search
CPC ...... F16C 19/06; F16C 27/045; F16C 27/066; F16C 2360/23; F01D 25/164; F02C 7/06;
(Continued)

(56) References Cited

U.S. PATENT DOCUMENTS 1,522,315 A  *  1/1925  Nash ....................... B60B 9/005
                                                      152/82
4,422,780 A  *  12/1983  Glaeser ................... F16C 27/04
                                                      384/215
(Continued)

FOREIGN PATENT DOCUMENTS

CN          2769611 Y      4/2006
CN          10101521 A     8/2007
(Continued)

OTHER PUBLICATIONS

International Gas Turbine and Aeroengine Congress and Exposition Orlando, FL Jun. 3-6, 1991 Rotordynamic Evaluation of an Advanced Multi-Squeeze Film Damper—Imbalance Response and Blade loss Simulation.

(Continued)

*Primary Examiner* — Marcus Charles
(74) *Attorney, Agent, or Firm* — Dority & Manning, P.A.

(57) ABSTRACT

A damper assembly includes a bearing assembly including a bearing outer race. A damper inner race is spaced from the bearing outer race and includes a plurality of circumferentially-spaced first openings. The damper assembly also includes a damper outer race spaced from damper inner race and a plurality of damper segments extending between the damper inner race and the damper outer race. Each damper segment includes a plurality of second openings.

20 Claims, 7 Drawing Sheets

(51) Int. Cl.
*F02C 7/06* (2006.01)
*F16C 35/07* (2006.01)
*F16C 35/077* (2006.01)

(52) U.S. Cl.
CPC ........ *F16C 35/077* (2013.01); *F05D 2240/50* (2013.01); *F05D 2260/96* (2013.01); *F16C 2326/43* (2013.01); *F16C 2360/23* (2013.01)

(58) Field of Classification Search
CPC . F16F 15/021; F05D 2260/50; F05D 2260/96
USPC ..... 384/91, 99, 119, 535–536, 581; 267/122
See application file for complete search history.

(56) References Cited

U.S. PATENT DOCUMENTS

| | | | |
|---|---|---|---|
| 4,971,458 A | 11/1990 | Carlson | |
| 4,992,024 A | 2/1991 | Heydrich | |
| 5,067,825 A * | 11/1991 | Vance | F16F 15/0237 384/99 |
| 5,207,511 A * | 5/1993 | Bobo | F01D 25/164 384/581 |
| 5,215,384 A * | 6/1993 | Maier | F16C 17/03 384/117 |
| 5,380,100 A * | 1/1995 | Yu | F16F 15/0237 267/113 |
| 5,421,655 A | 6/1995 | Ide et al. | |
| 5,425,584 A | 6/1995 | Ide | |
| 5,489,155 A | 2/1996 | Ide | |
| 5,738,445 A | 4/1998 | Gardner | |
| 6,325,546 B1 * | 12/2001 | Storace | F01D 21/04 384/536 |
| 6,682,219 B2 | 1/2004 | Alam et al. | |
| 6,883,967 B2 * | 4/2005 | Robb | F16C 35/077 384/536 |
| 7,018,104 B2 * | 3/2006 | Dourlens | F16C 17/03 384/309 |
| 7,553,123 B2 | 6/2009 | Casaro | |
| 7,625,121 B2 * | 12/2009 | Pettinato | F16C 17/03 384/117 |
| 7,628,542 B2 | 12/2009 | Wada et al. | |
| 8,118,570 B2 | 2/2012 | Meacham et al. | |
| 8,202,003 B2 | 6/2012 | Klusman et al. | |
| 8,209,834 B2 * | 7/2012 | Mons | F01D 5/085 29/281.1 |
| 8,267,592 B2 | 9/2012 | Godleski | |
| 8,272,786 B2 * | 9/2012 | Cottrell | B64D 27/26 188/298 |
| 8,591,117 B2 * | 11/2013 | Giraud | F16C 27/045 384/535 |
| 8,636,413 B2 * | 1/2014 | Fiedler | F01D 25/164 384/535 |
| 9,279,449 B2 | 3/2016 | Rouesne | |
| 2016/0160924 A1 * | 6/2016 | Meyers | F01D 25/164 384/474 |

FOREIGN PATENT DOCUMENTS

| | | | | |
|---|---|---|---|---|
| CN | 102927196 A | | 2/2013 | |
| DE | 3617403 A1 | | 12/1986 | |
| JP | 2003083325 A | * | 3/2003 | ............ F16C 27/045 |
| JP | 2010/270673 A | | 12/2010 | |

OTHER PUBLICATIONS

Pratap, Rudra et al, "Squeeze Film Effects in MEMS Devices", Journal of the Indian Institute of Science, 2007, pp. 75-94.

Steen, Tod et al, "System and Method for a Variable Squeeze Film Damper", co-pending application, U.S. Appl. No. 15/135,908, filed Apr. 22, 2016, 21 pp.

Chinese Search Report Corresponding to Application No. 201820414298 dated Aug. 7, 2019.

* cited by examiner

SQUEEZE FILM DAMPER ASSEMBLIES

FIELD OF THE INVENTION

The field of the disclosure relates generally to damper systems and, more particularly, to a squeeze film damper assembly for use within gas turbine engines.

BACKGROUND OF THE INVENTION

At least some known rotary machine, such as gas turbine engines, typically include squeeze film dampers that provide damping to rotating components, such as a rotor shaft, to reduce and control vibration. At least some known squeeze film dampers include a bearing support member, such as an outer race of a rolling element bearing supported shaft, fitted within an annular housing chamber that restricts radial motion of the bearing support member. An annular film space is defined between an outer surface of the outer race and an opposite inner surface of the bearing housing such that damper oil can be introduced therein. Vibratory and/or radial motion of the shaft and its bearing generate hydrodynamic forces in the damper oil within the annular film space that result in damping forces causes by the movement of the shaft.

In known squeeze film damper systems, the provided damping is generally consistent during engine start conditions and during engine cruising operating conditions. However, gas turbine engines typically require a greater amount of damping during engine start conditions, such as during bowed rotor starts, rather than during normal gas turbine engine cruising conditions when excess damping can decrease engine efficiency.

BRIEF DESCRIPTION OF THE INVENTION

In one aspect, a damper assembly is provided. The damper assembly includes a bearing assembly including a bearing outer race. A damper inner race is spaced from the bearing outer race and includes a plurality of circumferentially-spaced first openings. The damper assembly also includes a damper outer race spaced from the damper inner race and a plurality of damper segments extending between the damper inner race and the damper outer race. Each damper segment includes a plurality of second openings.

In one aspect of the disclosure, which may include at least a portion of the subject matter of any of the preceding and/or following examples and aspects, the plurality of first openings are radially oriented and the plurality of second openings are circumferentially oriented.

In one aspect of the disclosure, which may include at least a portion of the subject matter of any of the preceding and/or following examples and aspects, the damper inner race is spaced from the bearing outer race by an inner fluid plenum, and the damper outer race is spaced from the damper inner race by an outer fluid plenum.

In one aspect of the disclosure, which may include at least a portion of the subject matter of any of the preceding and/or following examples and aspects, the plurality of first openings couple the inner fluid plenum in flow communication with the outer fluid plenum.

In one aspect of the disclosure, which may include at least a portion of the subject matter of any of the preceding and/or following examples and aspects, the plurality of damper segments extends radially through the outer fluid plenum.

In one aspect of the disclosure, which may include at least a portion of the subject matter of any of the preceding and/or following examples and aspects, the plurality of first openings are through holes extending from a radially inner surface of the damper inner race to a radially outer surface of the damper inner race, and the plurality of second openings are through holes extending from a first circumferential surface of the damper segment to a second circumferential surface of the damper segment.

In one aspect of the disclosure, which may include at least a portion of the subject matter of any of the preceding and/or following examples and aspects, the damper outer race is spaced from the damper inner race by an outer fluid plenum, the outer fluid plenum including a plurality of circumferentially-spaced chambers separated by the plurality of damper segments.

In one aspect of the disclosure, which may include at least a portion of the subject matter of any of the preceding and/or following examples and aspects, the plurality of circumferentially-spaced chambers includes a first chamber and a circumferentially adjacent second chamber separated from the first chamber by a first damper segment of the plurality of damper segments, and the plurality of second openings couple the first chamber in flow communication with the second chamber.

In one aspect of the disclosure, which may include at least a portion of the subject matter of any of the preceding and/or following examples and aspects, the plurality of damper segments includes a single damper segment positioned circumferentially between a pair of adjacent first openings of the plurality of first openings defined through the damper inner race.

In another aspect, a damper assembly is provided. The damper assembly includes a bearing assembly including a bearing outer race, a damper outer race spaced from the bearing outer race, and a fluid plenum defined between the bearing outer race and the damper outer race. The damper assembly also includes a plurality of circumferentially-spaced damper segments extending within the fluid plenum between the damper outer race and the bearing outer race. Each damper segment extends between the damper outer race and the bearing outer race along an arcuate path.

In one aspect of the disclosure, which may include at least a portion of the subject matter of any of the preceding and/or following examples and aspects, each damper segment includes a first end fixedly coupled to the bearing outer race and a second end slidably coupled to the damper outer race.

In one aspect of the disclosure, which may include at least a portion of the subject matter of any of the preceding and/or following examples and aspects, each damper segment includes a plurality of openings defined therethrough.

In one aspect of the disclosure, which may include at least a portion of the subject matter of any of the preceding and/or following examples and aspects, each opening is a through hole extending between a first surface of the damper segment and a second surface of the damper segment such that the openings channel fluid through the damper segment.

In one aspect of the disclosure, which may include at least a portion of the subject matter of any of the preceding and/or following examples and aspects, each opening of the plurality of openings is oriented substantially perpendicular to the first and second surfaces immediately surrounding the opening.

In one aspect of the disclosure, which may include at least a portion of the subject matter of any of the preceding and/or following examples and aspects, each opening of the plurality of openings is obliquely oriented with respect to the first and second surfaces immediately surrounding the opening.

In one aspect of the disclosure, which may include at least a portion of the subject matter of any of the preceding and/or following examples and aspects, the plurality of openings includes a plurality of rows of openings.

In one aspect of the disclosure, which may include at least a portion of the subject matter of any of the preceding and/or following examples and aspects, the fluid plenum includes a plurality of chambers separated by the plurality of damper segments. The plurality of chambers includes a first chamber and a circumferentially adjacent second chamber separated by a first damper segment of the plurality of damper segments.

In one aspect of the disclosure, which may include at least a portion of the subject matter of any of the preceding and/or following examples and aspects, the first damper segment includes a plurality of openings that couple the first chamber in flow communication with the second chamber.

In one aspect of the disclosure, which may include at least a portion of the subject matter of any of the preceding and/or following examples and aspects, each damper segment includes a first end slidably coupled to the bearing outer race and a second end fixedly coupled to the damper outer race.

In one aspect of the disclosure, which may include at least a portion of the subject matter of any of the preceding and/or following examples and aspects, the plurality of damper segments are flexible.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION OF THE INVENTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of squeeze film damping assemblies as described herein provide additional viscous damping to facilitate improving performance of a rotary machine. For example, the damping assemblies and methods described herein provide for low damping at low eccentricity in certain engine operating conditions and also provide for high damping at high eccentricity in different engine operating conditions. More specifically, the damping assemblies and methods described herein provide customized and more effective damping at different engine operating conditions in a passive manner. The damper assemblies described herein are larger than many known damper assemblies and achieve the desired damping by channeling fluid through openings in the damper under high squeeze pressure. Furthermore, the larger size damper assembly avoids high damping in cases where the viscosity of the fluid is higher than desired, and especially when the eccentricity is low.

With these embodiments, low eccentricity operations have reduced flow rates through the tangential openings, thereby having only reduced viscous damping and all the damping from the damper would be due to squeezing action of fluid within each segment. Under high eccentricity operations, the flow rates through the tangential openings are higher due to higher dynamic pressure difference between chambers. This results in higher viscous damping along with the fluid squeeze action, thereby providing overall higher energy dissipation. This increasing damping with eccentricity helps achieve higher capacity for the damper before bottoming out under a specific loading condition for similar sized dampers. The tailored distribution of tangential and radial openings in the embodiments described herein provide passive damper control for specific operating conditions complementing a standard squeeze film damper which reduces the damping as eccentricity of operation is increased.

One embodiment of a damping assembly described herein includes a bearing assembly including a bearing outer race. A damper inner race is spaced from the bearing outer race and includes a plurality of circumferentially-spaced first openings. The damper assembly also includes a damper outer race spaced from damper inner race and a plurality of damper segments extending between the damper inner race and the damper outer race. Each damper segment includes a plurality of second openings. In an alternative embodiment, the damping assembly includes a bearing assembly including a bearing outer race, a damper outer race spaced from the bearing outer race, and a fluid plenum defined between the bearing outer race and the damper outer race. The damper assembly also includes a plurality of circumferentially-spaced damper segments extending within the fluid plenum between the damper outer race and the bearing outer race. Each damper segment extends between the damper outer race and the bearing outer race along an arcuate path and includes a plurality of openings to enable damping fluid to flow therethrough.

Figure 1:
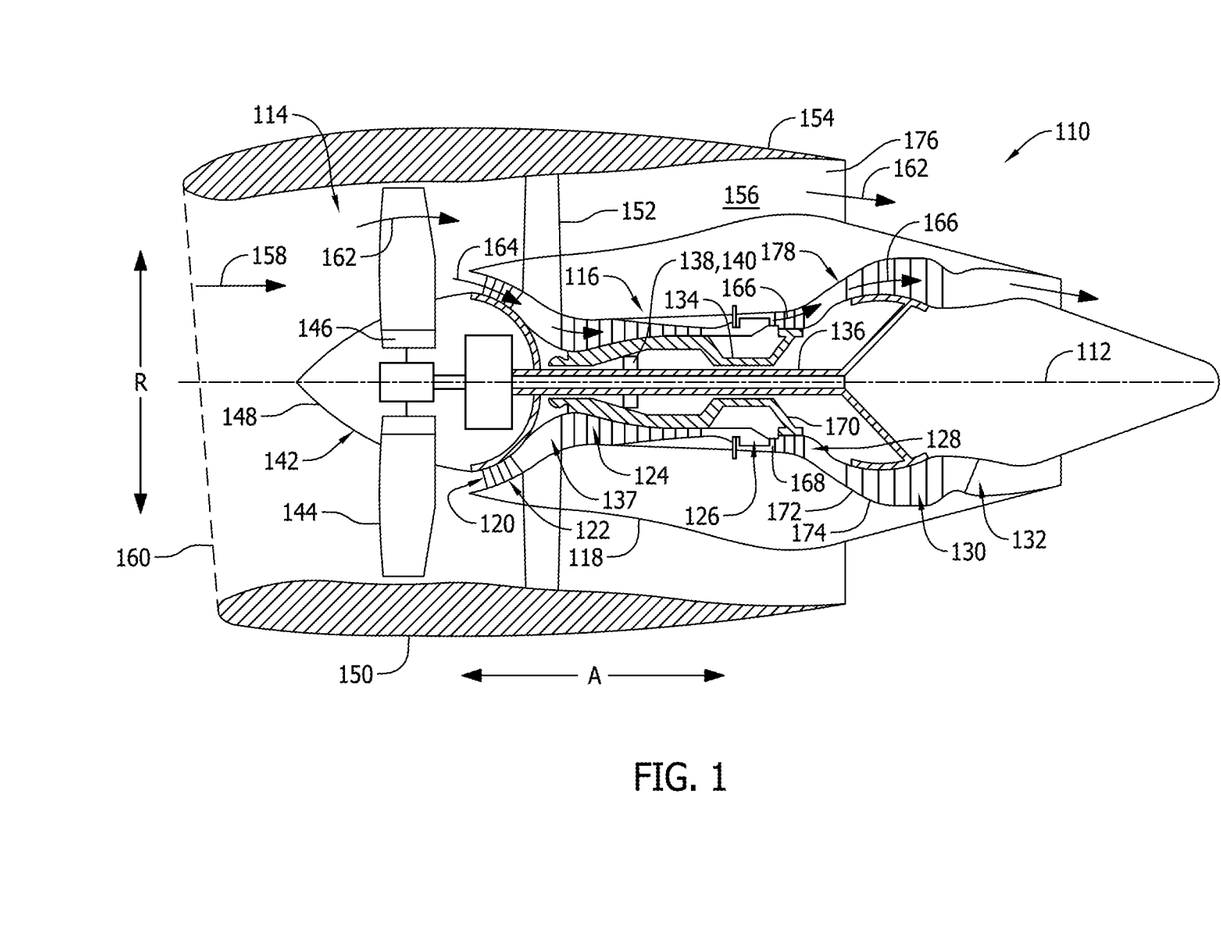
FIG. 1 is a schematic illustration of an exemplary gas turbine engine in accordance with an example embodiment of the present disclosure.

FIG. 1 is a schematic cross-sectional view of a gas turbine engine in accordance with an exemplary embodiment of the present disclosure. In the exemplary embodiment, the gas turbine engine is a high-bypass gas turbine engine 110. As shown in FIG. 1, gas turbine engine 110 defines an axial direction A (extending parallel to a longitudinal centerline 112 provided for reference) and a radial direction R (extending perpendicular to longitudinal centerline 112). In general, gas turbine engine 110 includes a fan case assembly 114 and a core gas turbine engine 116 disposed downstream from fan case assembly 114.

Core gas turbine engine 116 includes a substantially tubular outer casing 118 that defines an annular inlet 120. Outer casing 118 encases, in a serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. Each shaft 134 and 136 is supported by a plurality of bearing assemblies 138 having a damping assembly 140. The compressor section, combustion section 126, turbine section, and exhaust nozzle section 132 together define a core air flow path 137.

In the exemplary embodiment, fan case assembly 114 includes a fan 142 having a plurality of fan blades 144 coupled to a disk 146 in a spaced apart manner. As depicted, fan blades 144 extend outwardly from disk 146 generally along radial direction R. Fan blades 144 and disk 146 are together rotatable about longitudinal centerline 112 by LP shaft 136.

Referring still to the exemplary embodiment of FIG. 1, disk 146 is covered by rotatable front hub 148 aerodynamically contoured to promote an airflow through plurality of fan blades 144. Additionally, exemplary fan case assembly 114 includes an annular fan casing or outer nacelle 150 that circumferentially surrounds fan 142 and/or at least a portion of core gas turbine engine 116. It should be appreciated that nacelle 150 may be configured to be supported relative to core gas turbine engine 116 by an outlet guide vane assembly 152. Moreover, a downstream section 154 of nacelle 150 may extend over an outer portion of core gas turbine engine 116 so as to define a bypass airflow passage 156 therebetween.

During operation of gas turbine engine 110, a volume of air 158 enters gas turbine 110 through an associated inlet 160 of nacelle 150 and/or fan case assembly 114. As air 158 passes across fan blades 144, a first portion 162 of air 158 is directed or routed into bypass airflow passage 156 and a second portion 164 of air 158 is directed or routed into core air flow path 137, or more specifically into booster compressor 122. The ratio between first portion 162 of air 158 and second portion 164 of air 158 is commonly known as a bypass ratio. The pressure of second portion 164 of air 158 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, thus causing LP shaft or spool 136 to rotate, thereby supporting operation of booster compressor 122 and/or rotation of fan 142. Combustion gases 166 are subsequently routed through jet exhaust nozzle section 132 of core gas turbine engine 116 to provide propulsive thrust. Simultaneously, the pressure of first portion of air 162 is substantially increased as first portion of air 162 is routed through bypass airflow passage 156, including through outlet guide vane assembly 152 before it is exhausted from a fan nozzle exhaust section 176 of gas turbine engine 110, also providing propulsive thrust. HP turbine 128, LP turbine 130, and jet exhaust nozzle section 132 at least partially define a hot gas path 178 for routing combustion gases 166 through core gas turbine engine 116.

In operation, each shaft 134 and/or 136 generally rotates about longitudinal centerline 112. However, during some operating conditions, such as, but not limited to, a bowed rotor start and/or imbalanced load, shaft 134 and/or 136 undergoes an eccentric or orbiting motion which induces vibration and deflection that may propagate or transfer to other gas turbine engine 110 locations. In the exemplary embodiment, damping assembly 140 is provided at bearing assembly 138 of shafts 134 and/or 136 to reduce vibration and deflection loads within gas turbine engine 110 caused by the rotating shafts 134 and/or 136. In alternative embodiments, damping assembly 140 may be positioned at any location along rotating shafts 134 and/or 136

It should be appreciated, however, that exemplary gas turbine engine 110 depicted in FIG. 1 is by way of example only, and that in other exemplary embodiments, gas turbine engine 110 may have any other suitable configuration. It should also be appreciated, that in still other exemplary embodiments, aspects of the present disclosure may be incorporated into any other suitable rotary machine. For example, in other exemplary embodiments, aspects of the present disclosure may be incorporated into, e.g., a turboprop engine, core engine, auxiliary power unit, and test rig.

Figure 2:
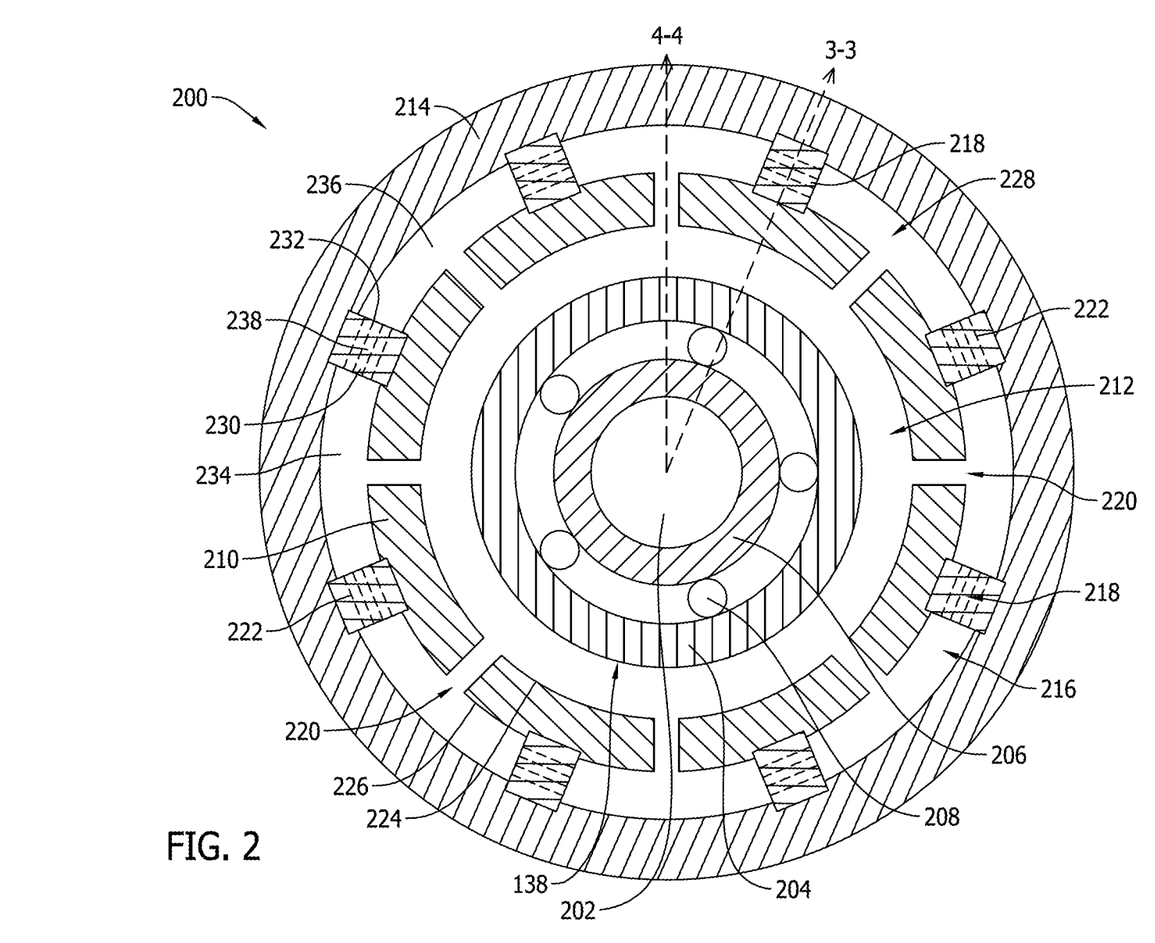
FIG. 2 is a cross-sectional view of an exemplary damping system that may be used with the gas turbine engine shown in FIG. 1.
Figure 3:
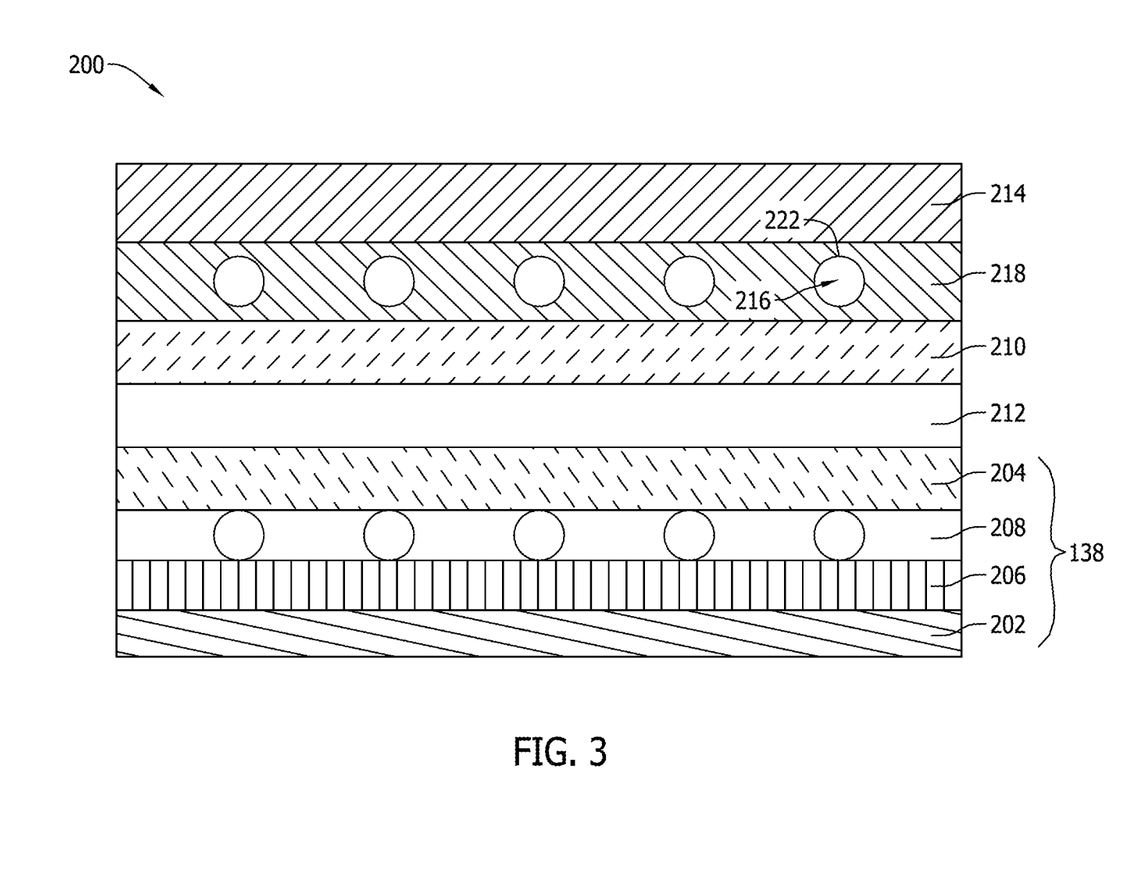
FIG. 3 is a cross-sectional view of the damping system shown in FIG. 2 along line 3-3.
Figure 4:
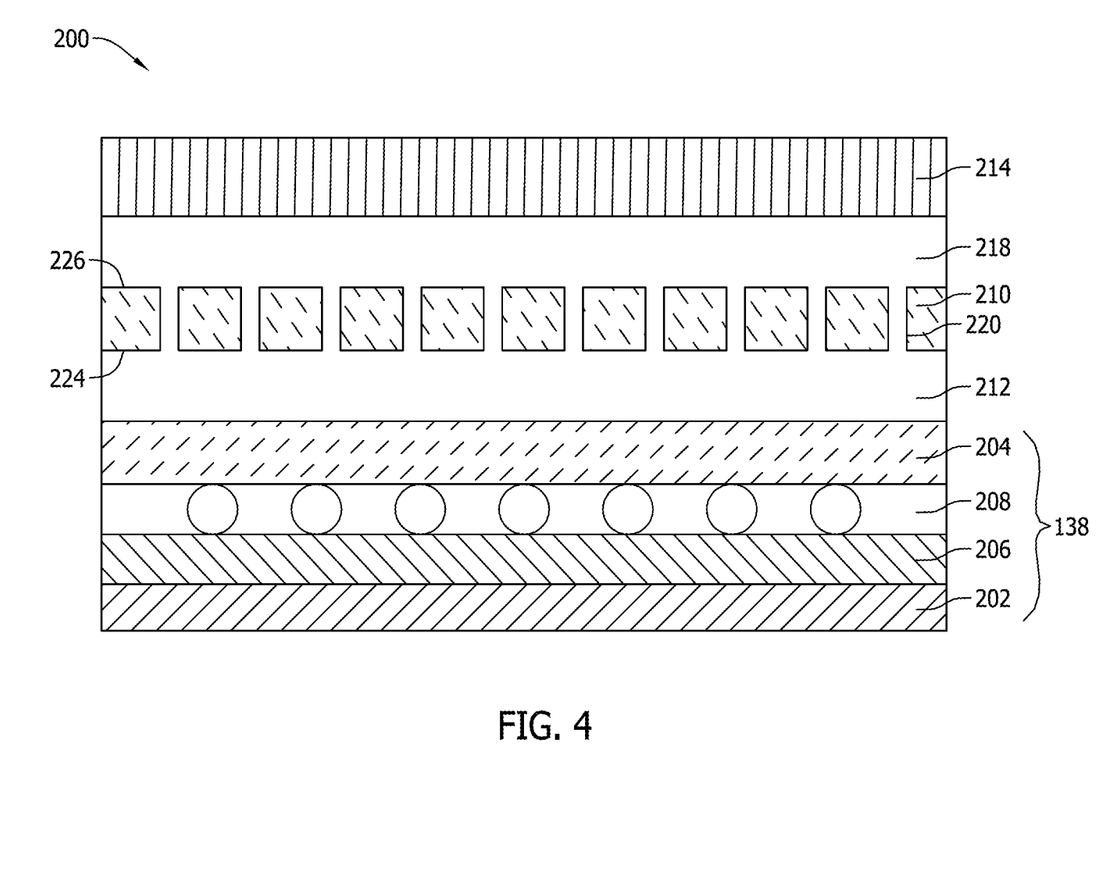
FIG. 4 is a cross-sectional view of the damping system shown in FIG. 2 along line 4-4.

FIG. 2 is a cross-sectional view of an exemplary damper assembly 200 that may be used as damping assembly 140 in gas turbine engine 110 (shown in FIG. 1). FIG. 3 is a cross-sectional view of damper assembly 200 along line 3-3 shown in FIG. 2. FIG. 4 is a cross-sectional view of damper assembly 200 along line 4-4 shown in FIG. 2.

In the exemplary embodiment, damper assembly 200 is a squeeze film damper. As shown in FIGS. 2 and 3, a shaft 202, such as HP shaft 134 or LP shaft 136, is rotatably supported by bearing assembly 138. Specifically, bearing assembly 138 is illustrated as a conventional roller bearing that includes a bearing outer race 204, a radially inner bearing inner race 206, and a plurality of roller elements 208 therebetween. Bearing outer race 204 circumferentially surrounds shaft 202, bearing inner race 206, and roller elements 208. Shaft 202 is circumferentially rotatably supported by bearing inner race 206. In alternative embodiments, bearing assembly 138 is any other bearing that enables damper assembly 200 to function as described herein.

Damper assembly 200 includes a damper inner race 210 spaced from bearing outer race 204 by an inner fluid plenum 212. In the exemplary embodiment, damper assembly 200 also includes a damper outer race 214 spaced from the damper inner race 210 by an outer fluid plenum 216. Furthermore, damper assembly 200 includes a plurality of damper segments 218 extending radially between damper inner race 210 and damper outer race 214 through outer fluid plenum 216.

In the exemplary embodiment, damper inner race 210 includes a plurality of circumferentially-spaced first openings 220, and each damper segment 218 includes a plurality of second openings 222. As shown in FIG. 2, first openings 220 in damper inner race 210 are radially oriented. More specifically, first openings 220 are through holes extending from a radially inner surface 224 of damper inner race 210 to a radially outer surface 226 of damper inner race 210 such that first openings 220 couple inner fluid plenum 212 in flow communication with outer fluid plenum 216. Furthermore, damper segments 218 are arranged such that a single damper segment 218 is positioned circumferentially between a pair of adjacent first openings 220 of the plurality of first openings 220 that are defined through damper inner race 210. Although first and second openings 220 and 222 are shown in FIGS. 2-4 as being circular, it is contemplated that first and second openings 220 and 222 may be circular, tapered, ovular, spiral, or any combination thereof. Generally, first and second openings 220 and 222 may be any shape that facilitates operation of damper assembly 200 as described herein. Additionally, although eight openings 220 and eight damper segments 218 are shown in FIG. 2, it is contemplated that damper assembly 200 includes any number of openings 220 and damper segments 218 to facilitate operation of damper assembly 200 as described herein.

Outer fluid plenum 216 includes a plurality of circumferentially-spaced chambers 228 that are separated by the plurality of damper segments 218 such that adjacent chambers 228 are separated by a single damper segment 218. As shown in FIGS. 2 and 3, second openings 222 are circumferentially oriented and form through holes extending from a first circumferential surface 230 of damper segments 218 to a second circumferential surface 232 of damper segments 218. More specifically, the plurality of chambers 228 includes a first chamber 234 and a circumferentially adjacent second chamber 236 separated from first chamber 234 by a first damper segment 238 of the plurality of damper segments 218. As shown in FIG. 2, the plurality of second openings 222 couple first chamber 234 in flow communication with second chamber 236.

In operation, bearing outer race 204 of bearing assembly 138 is restricted from rotating relative to damper inner race 210 and damper outer race 214, such that rotation is limited to bearing inner race 206 and shaft 202, though the entire bearing assembly 138 and its shaft 202 are free to move radially and orbitally within damper assembly 200 in response to vibrations and dynamic loads within shaft 202. During shaft 202 loading, fluids within fluid plenums 212 and 216 are pressurized as bearing assembly 138 and shaft 202 are radially displaced, and the fluid is channeled from inner plenum 212 to outer fluid plenum 216 through openings 220 in damper inner race 210 and fluid is also channeled between adjacent chambers 228 in outer fluid plenum 216 though openings 222 in damper segments 218 to provide damping to engine 110. The action of squeezing damping fluid through openings 220 and 222 provides additional viscous damping depending on the flow velocity and the size of openings 220 and 222. The overall damping of damper assembly 200 increases with eccentricity, due to higher viscous damping through openings 220 and 222 and hence provides for higher damping capacity in rotor-dynamic responses than traditional dampers of the same size.

Figure 5:
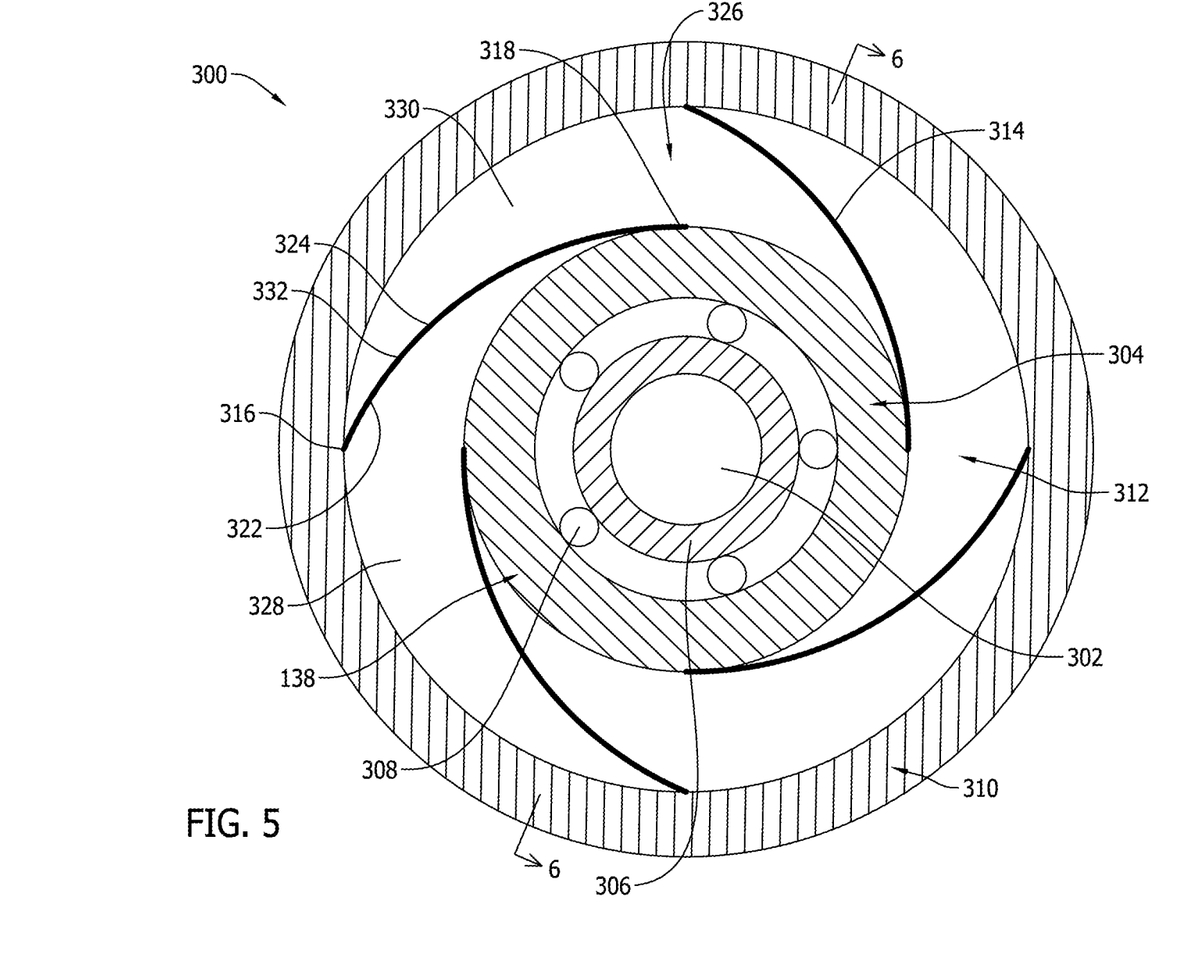
FIG. 5 is a cross-sectional view of an alternative damping system that may be used with the gas turbine engine shown in FIG. 1.
Figure 6:
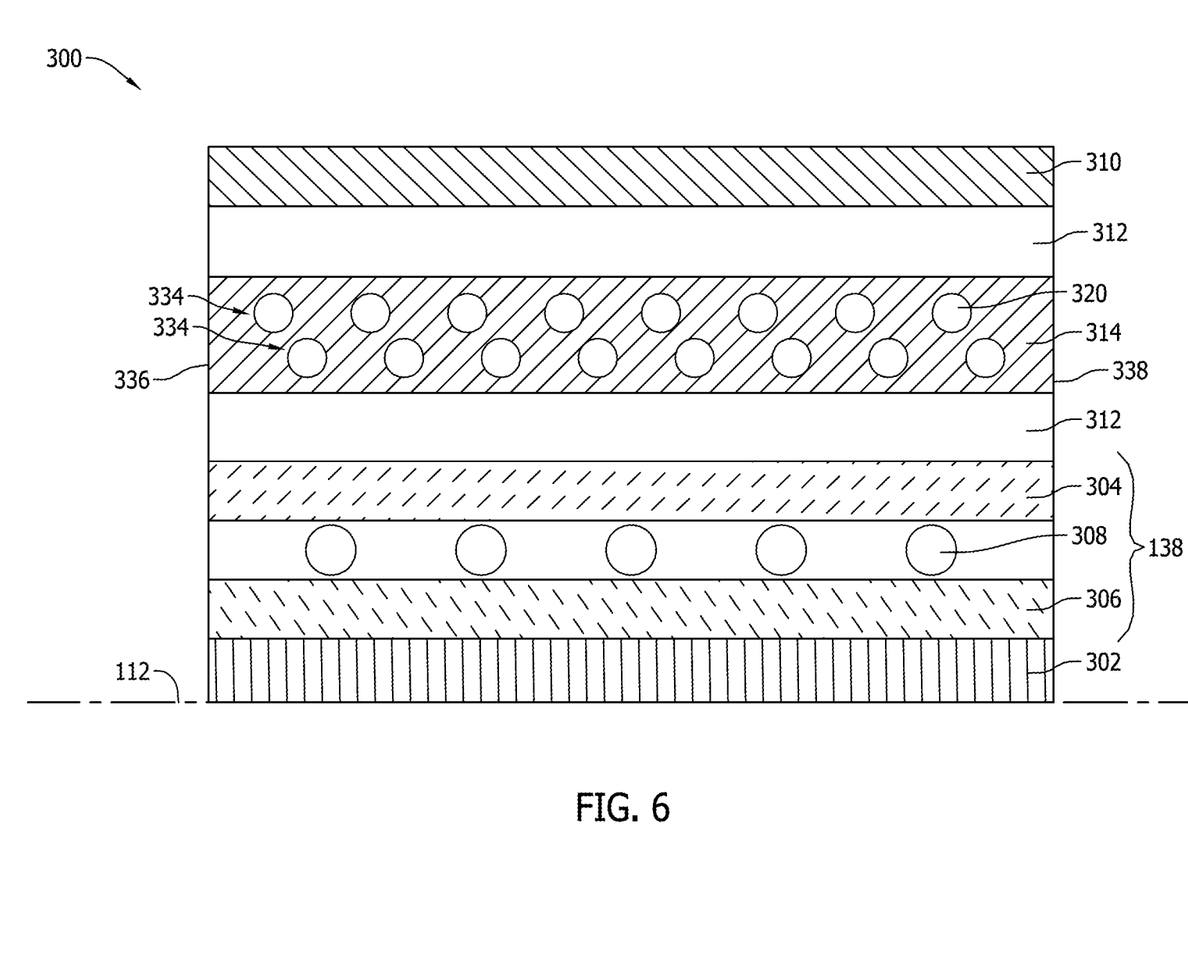
FIG. 6 is a cross-sectional view of the damping system shown in FIG. 5 along line 6-6.
Figure 7:
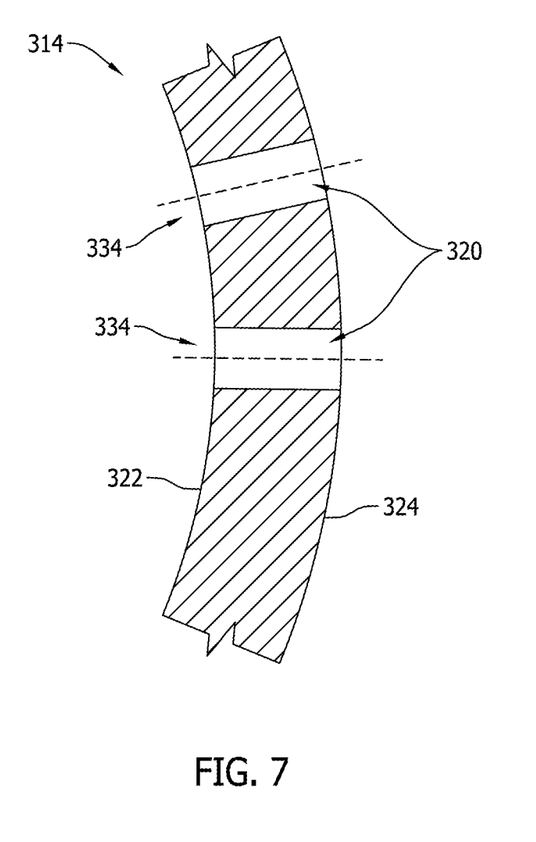
FIG. 7 is a cross-sectional view of an exemplary damping segment that may be used with the damping system shown in FIG. 5.
Figure 8:
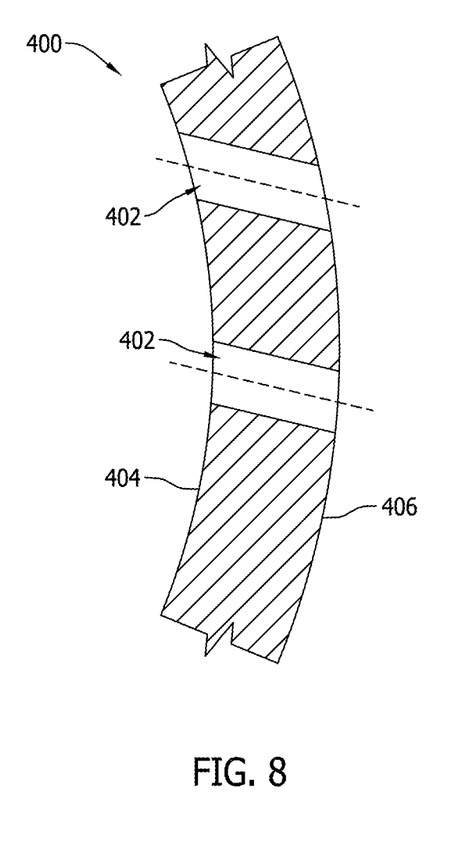
FIG. 8 is a cross-sectional view of an alternative damping segment that may be used with the damping system shown in FIG. 5.

FIG. 5 is a cross-sectional view of an alternative damper assembly 300 that may be used as damping assembly 140 in gas turbine engine 110 (shown in FIG. 1). FIG. 6 is a cross-sectional view of damper assembly 300 along line 6-6 shown in FIG. 5. FIG. 7 is a cross-sectional view of an exemplary damper segment 314 that may be used with damper assembly 300. FIG. 8 is a cross-sectional view of an alternative damping segment 400 that may be used with the damper assembly 300.

Damper assembly 300 is a squeeze film damper. As shown in FIGS. 5 and 6, a shaft 302, such as HP shaft 134 or LP shaft 136, is rotatably supported by bearing assembly 138. Specifically, bearing assembly 138 is illustrated as a conventional roller bearing that includes a bearing outer race 304, a radially inner bearing inner race 306, and a plurality of roller elements 308 therebetween. Bearing outer race 304 circumferentially surrounds shaft 302, bearing inner race 306, and roller elements 308. Shaft 302 is circumferentially rotatably supported by bearing inner race 306. In alternative embodiments, bearing assembly 138 is any other bearing that enables damper assembly 300 to function as described herein.

As shown in FIG. 5, damper assembly 300 includes a damper outer race 310 spaced from bearing outer race 304 and a fluid plenum 312 defined radially between damper outer race 310 and bearing outer race 304. Damper assembly 300 also includes a plurality of circumferentially-spaced damper segments 314 extending within fluid plenum 312 between damper outer race 310 and bearing outer race 304. As described in further detail below, each damper segment 314 extends between damper outer race 310 and bearing outer race 304 along an arcuate path. Additionally, although four damper segments 314 are shown in FIG. 5, it is contemplated that damper assembly 300 includes any number of damper segments 314 to facilitate operation of damper assembly 300 as described herein. Furthermore, damper assembly 300 may include additional fluid plenums and additional outer races and is not limited to the single fluid plenum 312 and damper outer race 310 shown in FIG. 5.

Each damper segment 314 includes a first end 316 and an opposing second end 318. First end 316 is fixedly or pivotally coupled to bearing outer race 304 and second end 318 is slidably coupled to damper outer race 310. When shaft 302 and bearing assembly 138 move radially, second ends 318 of damper segments 314 slide along damper outer race 310 in response. In other embodiments, second end 318 is fixedly or pivotally coupled to damper outer race 310 and first end 316 is slidably coupled to bearing outer race 304. Furthermore, damper segments 314 are flexible to account for the varying thicknesses of fluid plenum 312 during different operating modes of gas turbine engine 110 (shown in FIG. 1).

As best shown in FIGS. 5 and 7, each damper segment 314 includes a plurality of openings 320 defined therethrough. Specifically, each opening 320 is a through hole extending between a first surface 322 of damper segment 314 and a second surface 324 of damper segment 314 such that openings 320 channel fluid through damper segment 314. Even more specifically, fluid plenum 312 includes a plurality of chambers 326 separated by the plurality of damper segments 314. The plurality of chambers 326 includes a first chamber 328 and a circumferentially adjacent second chamber 330 separated by a first damper segment 332 of the plurality of damper segments 314. The plurality of openings 320 in damper segment 332 couple first chamber 328 in flow communication with second chamber 330 and facilitate channeling fluid between chambers 328 and 330 within fluid plenum 312. Although openings 320 are shown in FIGS. 5 and 7 as being circular, it is contemplated that openings 320 may be circular, tapered, ovular, spiral, or any combination thereof. Generally, openings 320 may be any shape that facilitates operation of damper assembly 300 as described herein.

In the exemplary embodiment, as shown in FIGS. 5-7, the plurality of openings 320 in damper segments 314 include a plurality of rows 334 of openings 320. More specifically, the plurality of rows 334 extend from first end 316 to second end 318 of each damper segment 314. Although only two rows 334 of openings 320 are shown in FIGS. 6 and 7, it is contemplated that each damper segment 314 includes any number of rows 334 of openings 320 to facilitate operation of damper assembly 300 as described herein. Additionally, adjacent rows 334 of openings 320 may be axially offset from adjacent rows 334 of openings 320 and each row 334 of openings 320 extends substantially an entire axial distance between a first axial end 336 and a second axial end 338 of each damper segment 314.

Furthermore, in the embodiment shown in FIG. 7, each opening 320 is oriented substantially perpendicular to first and second surfaces 322 and 324 immediately surrounding the opening 320. As such, openings 320 in different rows 334 of damper segment 314 are not all parallel to each other. More specifically, as the arcuate damper segment 314 extends in both the circumferential and radial directions between damper outer race 310 and bearing outer race 304, openings 320 that are perpendicular to surfaces 322 and 324 immediately surrounding the opening 320 are oriented in different directions in different portions of damper segment 314. For example, openings 320 in rows 334 proximate first end 316 of each damper segment 314 may be oriented in a different direction than openings 320 in rows 334 positioned in a central region of the damper segment 314. As such, damping fluid within fluid plenum 312 is channeled in different directions between damper outer race 310 and bearing outer race 304.

In another embodiment, as shown in FIG. 8, damper assembly 300 includes a damper segment 400 instead of damper segment 314. Damper segments 314 and 400 are substantially similar to each other with the exception that damper segment 400 includes a plurality of openings 402 that are obliquely oriented with respect to a first damper segment surface 404 and a second damper segment surface 406 that immediately surround the opening 402. In such an embodiment, openings 402 may or may not be parallel to each other. Furthermore, openings 402 may be oriented in a predetermined direction to channel fluid therethrough towards one of damper outer race 310 or bearing outer race 304.

With reference to FIGS. 5-8, in operation, bearing outer race 304 of bearing assembly 138 is restricted from rotating relative to damper outer race 310, such that rotation is limited to bearing inner race 306 and shaft 302, though the entire bearing assembly 138 and its shaft 302 are free to move radially and orbitally within damper assembly 300 in response to vibrations and dynamic loads within shaft 302. During shaft 302 loading, fluid within fluid plenum 312 is pressurized as bearing assembly 138 and shaft 302 are radially displaced, and the fluid is channeled between adjacent chambers 326 in fluid plenum 312 though openings 320 in damper segments 314 to provide damping to engine 110. The action of squeezing damping fluid through openings 320 provides additional viscous damping depending on the flow velocity and the size of openings 320. The overall damping of damper assembly 300 increases with eccentricity, due to higher viscous damping through openings 320 and hence provides for higher damping capacity in rotor-dynamic responses than traditional dampers of the same size. Furthermore, the additional viscous damping of damper assembly 300 enables damper assembly 300 to achieve similar levels of damping as traditional dampers, but in a larger size than traditional dampers. A larger size damper assembly 300 allows for a higher capacity (more shaft movement) before bearing outer race 304 would contact damper outer race 310.

The above-described embodiments of the squeeze film damping assemblies provide additional viscous damping to facilitate improving engine performance. Specifically, the damping assemblies and methods described herein provide for low damping at low eccentricity in certain engine operating conditions and also provides for high damping at high eccentricity in different engine operating conditions. One embodiment of a damping assembly described herein includes a bearing assembly including a bearing outer race. A damper inner race is spaced from the bearing outer race and includes a plurality of circumferentially-spaced first openings. The damper assembly also includes a damper outer race spaced from damper inner race and a plurality of damper segments extending between the damper inner race and the damper outer race. Each damper segment includes a plurality of second openings. In an alternative embodiment, the damping assembly includes a bearing assembly including a radially outer race, a damper outer race spaced from the bearing outer race, and a fluid plenum defined between the bearing outer race and the damper outer race. The damper assembly also includes a plurality of circumferentially-spaced damper segments extending within the fluid plenum between the damper outer race and the bearing outer race. Each damper segment extends between the damper outer race and the bearing outer race along an arcuate path.

With these embodiments, low eccentricity operations have reduced flow rates through the tangential openings, thereby having only reduced viscous damping and all the damping from the damper would be due to squeezing action of fluid within each segment. Under high eccentricity operations, the flow rates through the tangential openings are higher due to higher dynamic pressure difference between chambers. This results in higher viscous damping along with the fluid squeeze action, thereby providing overall higher energy dissipation. Increasing the damping with eccentricity provides for a larger design space for the damper geometry to achieve a similar level of damping when compared to conventional squeeze film dampers and also provides for a higher load capability before bottoming out under a specific loading condition for similar sized dampers. The tailored distribution of tangential and radial openings in the embodiments described herein provide passive damper control for specific operating conditions complementing a standard squeeze film damper which reduces the damping as eccentricity of operation is increased.

An exemplary technical effect of the methods, systems, and apparatus described herein includes at least one of: (a) increasing damping during predetermined engine operating conditions; (b) decreasing damping during other predetermined engine operating conditions; (c) increasing engine performance; (d) decreasing engine start times; (e) increasing engine horse power during high engine speed conditions; and (f) increasing engine stability under high power operating conditions.

Exemplary embodiments of methods, systems, and apparatus for the squeeze film dampers are not limited to the specific embodiments described herein, but rather, components of the systems and/or steps of the methods may be utilized independently and separately from other components and/or steps described herein. For example, the methods may also be used in combination with other systems requiring damper assemblies, and the associated methods, and are not limited to practice with only the systems and methods as described herein. Rather, the exemplary embodiment can be implemented and utilized in connection with many other applications, equipment, and systems that may benefit from damping a rotatable shaft.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What we claim is:

1. A damper assembly comprising:
a bearing assembly comprising a bearing outer race;
a damper inner race spaced from said bearing outer race, wherein said damper inner race comprises a plurality of circumferentially-spaced first openings;
a damper outer race spaced from said damper inner race; and
a plurality of damper segments extending from said damper inner race to said damper outer race, wherein each damper segment includes a plurality of second openings.

2. The assembly of claim 1, wherein said plurality of first openings are radially oriented and said plurality of second openings are circumferentially oriented.

3. The assembly of claim 1, wherein said damper inner race is spaced from said bearing outer race by an inner fluid plenum, and wherein said damper outer race is spaced from said damper inner race by an outer fluid plenum.

4. The assembly of claim 3, wherein said plurality of first openings couple said inner fluid plenum in flow communication with said outer fluid plenum.

5. The assembly of claim 3, wherein said plurality of damper segments extend radially through said outer fluid plenum between said plurality of first openings.

6. The assembly of claim 1, wherein said plurality of first openings are through holes extending from a radially inner surface of said damper inner race to a radially outer surface of said damper inner race, and wherein said plurality of second openings are through holes extending from a first circumferential surface of said damper segment to a second circumferential surface of said damper segment.

7. The assembly of claim 1, wherein said damper outer race is spaced from said damper inner race by an outer fluid plenum, said outer fluid plenum including a plurality of circumferentially-spaced chambers separated by said plurality of damper segments.

8. The assembly of claim 7, wherein said plurality of circumferentially-spaced chambers includes a first chamber and a circumferentially adjacent second chamber separated from said first chamber by a first damper segment of said plurality of damper segments, wherein said plurality of second openings couple said first chamber in flow communication with said second chamber.

9. The assembly of claim 1, wherein said plurality of damper segments includes a single damper segment positioned circumferentially between a pair of adjacent first openings of said plurality of first openings defined through said damper inner race.

10. A damper assembly comprising:
a bearing assembly comprising a bearing outer race;
a damper outer race spaced from said bearing outer race;
a fluid plenum defined between said bearing outer race and said damper outer race; and
a plurality of circumferentially-spaced damper segments extending within said fluid plenum between said damper outer race and said bearing outer race, wherein each damper segment extends between said damper outer race and said bearing outer race along an arcuate path and slidably coupled to said damper outer race or said bearing outer race.

11. The assembly of claim 10, wherein each damper segment includes a first end fixedly coupled to said bearing outer race and a second end slidably coupled to said damper outer race.

12. The assembly of claim 10, wherein each damper segment includes a plurality of openings defined therethrough.

13. The assembly of claim 12, wherein each opening is a through hole extending between a first surface of said damper segment and a second surface of said damper segment such that said plurality of openings channel fluid through said damper segment.

14. The assembly of claim 13, wherein each opening of said plurality of openings is oriented substantially perpendicular to said first and second surfaces immediately surrounding said opening.

15. The assembly of claim 13, wherein each opening of said plurality of openings is obliquely oriented with respect to said first and second surfaces immediately surrounding said opening.

16. The assembly of claim 12, wherein said plurality of openings includes a plurality of rows of openings.

17. The assembly of claim 10, wherein said fluid plenum includes a plurality of chambers separated by said plurality of damper segments, wherein said plurality of chambers includes a first chamber and a circumferentially adjacent second chamber separated by a first damper segment of said plurality of damper segments.

18. The assembly of claim 17, wherein said first damper segment includes a plurality of openings that couple said first chamber in flow communication with said second chamber.

19. The assembly of claim 10, wherein each damper segment includes a first end slidably coupled to said bearing outer race and a second end fixedly coupled to said damper outer race.

20. The assembly of claim 10, wherein said plurality of damper segments are flexible.

\* \* \* \* \*